United States Patent [19]

Chamberlin et al.

[11] E Patent Number: Re. 33,059

[45] Reissued Date of Patent: Sep. 19, 1989

[54] PARTIALLY ORIENTED NYLON YARN AND PROCESS

[75] Inventors: John M. Chamberlin; Edward W. Chilvers, Jr.; Walter J. Nunning; John H. Southern, all of Pensacola, Fla.

[73] Assignee: Monsanto Company, St. Louis, Mo.

[21] Appl. No.: 178,738

[22] Filed: Apr. 6, 1988

Related U.S. Patent Documents

Reissue of:

[64] Patent No.: 4,583,357
Issued: Apr. 22, 1986
Appl. No.: 594,522
Filed: Apr. 2, 1986

U.S. Applications:

[63] Continuation-in-part of Ser. No. 554,021, Nov. 21, 1983, which is a continuation-in-part of Ser. No. 546,127, Oct. 27, 1983, abandoned, which is a continuation-in-part of Ser. No. 488,490, Apr. 25, 1983, abandoned.

[51] Int. Cl.[4] ..... D02G 3/02
[52] U.S. Cl. ..... 57/243; 478/373
[58] Field of Search ..... 57/6, 227, 228, 243, 57/246, 247, 248, 350; 264/103, 210.8; 428/364, 373

[56] References Cited

U.S. PATENT DOCUMENTS

| | | | |
|---|---|---|---|
| 2,939,201 | 6/1960 | Holland | 28/82 |
| 3,109,195 | 11/1963 | Combs | 18/8 |
| 3,452,131 | 6/1969 | Geerdes | 264/210 |
| 3,987,136 | 10/1976 | Schippers | 264/103 |
| 3,994,121 | 11/1976 | Adams | 57/243 |
| 4,069,657 | 1/1978 | Bascom et al. | 57/228 |
| 4,093,147 | 6/1978 | Bromley et al. | 242/159 |
| 4,123,492 | 10/1978 | McNamara et al. | 264/210 |
| 4,181,697 | 1/1980 | Koschinek | 264/176 |
| 4,228,120 | 10/1980 | Bromley et al. | 264/235.6 |
| 4,229,500 | 10/1980 | Adachi et al. | 428/373 |
| 4,237,187 | 12/1980 | Raybon et al. | 428/373 X |

FOREIGN PATENT DOCUMENTS

| | | |
|---|---|---|
| 2117659 | 10/1972 | Fed. Rep. of Germany . |
| 4828012 | 8/1973 | Japan . |
| 2056362 | 3/1981 | United Kingdom . |

OTHER PUBLICATIONS

Fourne, "Synthetische Fasern", Wissenschaftliche Vergesellschaft m.b.H., Stuttgart, 1964.

Marks et al., "Man-Made Fiber Science and Technology", vol. 2, p. 218, Interscience Publishers, Copyright 1968 John Wiley and Sons, Inc.

Happey, "Applied Fibre Science", pp. 46–69, Academic Press, Inc., London 1979.

"Tech-Talk" Monsanto Publication, Sep. 1965.

*Primary Examiner*—Donald Watkins
*Attorney, Agent, or Firm*—Thomas N. Wallin

[57] ABSTRACT

An improved partially-oriented nylon 66 (PON) spinning process and product are provided by increasing the molecular weight well above the levels customary for apparel end uses.

8 Claims, 1 Drawing Sheet

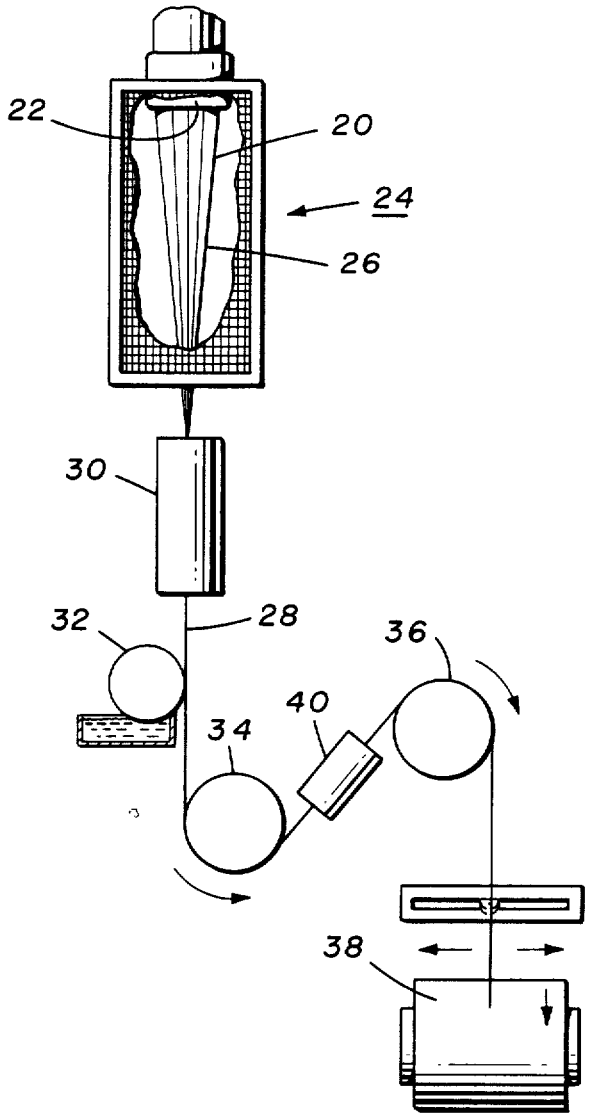
22
20
24
26
30
32
28
36
40
34
38

PARTIALLY ORIENTED NYLON YARN AND PROCESS

Matter enclosed in heavy brackets [ ] appears in the original patent but forms no part of this reissue specification; matter printed in italics indicates the additions made by reissue.

This application is a continuation-in-part of copending application Ser. No. 554,021 filed Nov. 21, 1983, which in turn is a continuation-in-part of application Ser. No. 546,127 filed Oct. 27,1983 (now abandoned), which in turn is a continuation-in-part of application Ser. No. 488,490, filed Apr. 25, 1983 (now abandoned).

As used in the specification and claims, the term "Nylon 66" shall mean those synthetic linear polyamides containing in the polymer molecule at least 85% by weight of recurring structural units of the formula $$\left[ \overset{O}{\overset{\|}{C}}-(CH_2)_4-\overset{O}{\overset{\|}{C}}-\overset{H}{\overset{|}{N}}-(CH_2)_6-\overset{H}{\overset{|}{N}} \right]$$

Historically, certain nylon 66 apparel yarns were spun at low speeds of up to about 1400 meters per minute and packaged. The spun yarns were then drawn on a second machine and packaged again. The drawn yarn was then false-twist textured at slow speeds of the order of 55–230 meters per minute by the pin-twist method, yielding a very high quality stretch yarn suitable for stretch garments such as leotards. An exemplary false-twisting element for the pin-twist texturing process is disclosed in Raschle U.S. Pat. No. 3,475,895. Pin-twist textured yarn is expensive, at least in part because of the relatively slow yarn speeds achievable during texturing.

More recently, various other types of false twisting apparatus have come into commercial use, and are collectively referred to as "friction-twist". Some of the most widely used of these include a disc aggregate of the general type illustrated in Yu U.S. Pat. No. 3,973,383, Fishbach U.S. Pat. No. 4,012,896 or Schuster U.S. Pat. No. 3,885,378. Friction-twisting permits considerably higher texturing speeds than pin-twisting, with yarn speeds currently at about 700–900 mpm. Such high texturing speeds are more economical than those attained by the pin-twist process.

Along with the shift to friction-twisting has come a shift to partially-oriented nylon 66 (PON) yarns as the feeder yarns for the friction-twist process. In the conventional PON spinning process the winding speed is merely increased from the previous standard of about 900–1500 meters per minute to speeds generally in the 2750–4000 meters per minute range, resulting in a PON yarn. PON yarn performs better in the high speed friction-twist texturing process than either the earlier drawn yarn or the low-speed spun yarn mentioned above. However, heretofore yarns textured by the friction-twist process were of distinctly lower quality in terms of crimp development than yarns textured by the pin-twist process. The apparel nylon 66 false-twist textured yarn market is accordingly in essentially two distinct segments: the older, expensive, high quality pin-twist yarns, and the newer, less costly, lower quality friction-twist yarns.

PON feeder yarns for false-twist texturing have had relative viscosities (R.V.'s) in the range from the middle or upper thirties to the low forties, as indicated by U.S. Pat. No. 3,994,121. Such yarns have more than adequate tenacity for conventional apparel end uses. With conventional nylon 66 polymerization techniques, increasing the polymer R.V. is expensive and leads to increased rates of gel formation, with consequent shortening of spinning pack (filter) life. High RV polymer is therefore ordinarily not used unless required for some special purpose, such as when high yarn tenacity is required.

According to the invention, there are provided improved yarns having improved processability and permitting manufacture of friction-twist yarns having increased crimp development, in some cases comparable to that of pin-twist yarns. The yarns of the present invention are nylon 66 yarns that have a denier between 15 and 250.

These yarns are generally characterized by a normalized SAXS peak intensity and a normalized lamellar dimensional product in each instance of at least 1.3, and preferably at least 1.75. While the mechanism or reason for the improved results of the present invention are not entirely understood, the increased values of normalized SAXS peak intensity and normalized lamellar dimensional product are distinctive as compared to conventional PON yarn, and the crystalline structure which results in yarns having these characteristic properties is believed to contribute to the improved results of the present invention. The normalized SAXS peak intensity in particular may be interpreted as indicating relatively more relaxed amorphous regions and relatively more highly developed crystalline regions in the yarns of this invention as compared to conventional PON yarn.

Alternatively or additionally, the yarns of this invention may be, and, in one preferred aspect, are, characterized by a relative viscosity (RV) greater than about 46 and an elongation between 55 and 150. Yarns having an RV of greater than 53 are more preferred and provide even better properties, while yarns having an RV greater than 60 are particularly preferred. Yarns of these RV's provide the processing characteristics discussed above, when prepared by spinning at speeds of 2200 MPM of higher.

Although an increase in RV results in lower elongation and higher tenacity when yarn is spun at speeds below about 2200 MPM, it has unexpectedly been discovered that such effect actually reverses at higher spinning speeds. At higher spinning speeds, an increase in RV results in higher elongation and lower tenacity.

Generally, the yarns of this invention may be marketed in conventional yarn packages which contain yarn at a winding tension less than about 0.4 grams per denier. Indeed, the yarns of this invention can be wound directly on stable packages without subjecting the yarn to the conventional PON heat treatment provided that the winding speed is adequate. The yarns have such good processability that they can provide less than 10 frays per kilogram of textured yarn when tested for processability at a draw texturing stress of 0.45, (preferably 0.47) or, in the case of the most preferred yarns of this invention, when tested at a draw-texturing stress of 0.48.

The increased crimp development of the yarns of this invention is, of course, a significant benefit. Increased crimp development provides a substantial increase in fabric covering power as compared to fabrics made from friction-twist yarns derived from conventional PON feeder yarns. Such increased covering power is apparent not only by visual inspection but also by reduced air permeability. Because of the increased covering power, less textured yarn is required to provide a fabric of equivalent covering power, thereby offering the potential of economic savings to the fabric manufacturer. Increased productivity in spinning and texturing, as provided by the practice of this invention, also offers the potential of substantial economic savings to the yarn manufacturer and to the throwster.

Various aspects of the invention are addressed in more detail below.

According to the first principal aspect of the invention, there is provided a nylon 66 apparel yarn suitable for friction twist texturing having a denier between 15 and 250, a normalized SAXS peak intensity of at least 1.3 and a normalized lamellar dimension of at leat 1.3. The preferred yarns according to this aspect of the invention provide less than 10 frays per kilogram of textured yarn when tested for processability at a draw texturing stress of 0.45 grams per denier, with superior yarns doing so when tested at a draw-texturing stress of 0.47 grams per denier, and the particularly preferred yarns doing so when tested at a draw-texturing stress of 0.48 grams per denier.

According to a second principal aspect of the invention there is provided a nylon 66 yarn suitable for draw-texturing, the yarn having an RV greater than 46, a denier between 15 and 250 and providing less than 10 frays per kilogram of textured yarn when tested for processability at a draw-texturing stress of 0.45 grams per denier. Preferred yarns according to this aspect provide less than 10 frays per kilogram of yarn when tested for processability at a draw-texturing stress of 0.47 grams per denier, with especially preferred yarns doing so at a draw-texturing stress of 0.48 grams per denier. Other preferred yarns according to this aspect have RV's greater than 53 (preferably greater than 60), and have deniers between 35 and 140. Other preferred yarns according to this aspect have normalized SAXS peak intensities and normalized lamellar dimensional products above 1.3, and preferably above 1.75.

According to the third principal aspect of the invention, there is provided a yarn package having wound thereon at a winding tension less than 0.4 grams per denier a multifilament nylon 66 feed yarn for draw-texturing spun at a spinning speed greater than 2200 MPM, the yarn having an RV greater than 46, an elongation between 55 and 150%, and a denier between 15 and 250 (preferably between 35 and 140). The winding tension is preferably between 0.03 and 0.25 grams per denier, and the yarn RV is preferably greater than 53, with yarn RV's greater than 60 being particularly advantageous. Yarn elongations between 55 and 100% are particularly preferred.

According to a fourth principal aspect of the invention, there is provided a yarn package having wound thereon at a winding tension less than 0.4 grams per denier an untextured multifilament nylon 66 feed yarn for draw-texturing having a denier between 15 and 250 and a normalized SAXS peak intensity greater than 1.3 and normalized lamellar dimensional product greater than 1.3. Yarns having normalized SAXS peak intensities greater than 1.75 and normalized lamellar dimensional products greater than 1.75 are particularly preferred.

According to a fifth principal aspect of the invention, there is provided a process for producing a multifilament nylon 66 feed yarn for drawtexturing spun at a spinning speed greater than 2200 MPM, comprising extruding at a given rate a plurality of molten streams of nylon 66 polymer through spinneret capillaries, quenching the streams into filaments, withdrawing the filaments from the streams at a given spinning speed above 2200 meters per minute, merging the filaments into a yarn, and winding the yarn on a package at a winding tension less than 0.4 grams per denier, the rate, the polymer, the capillaries and the spinning speed being selected such that the yarn on the package has a denier between 15 and 250, an elongation-to-break between 55% and 150%, and an RV greater than 46. The winding tension is preferably between 0.03 and 0.25 grams per denier, and the yarn RV is preferably greater than 53, with yarn RV's greater than 60 being particularly advantageous. Yarn elongations between 55 and 100% are especially preferred.

According to a sixth principal aspect of the invention, there is provided a process for producing a multifilament nylon 66 yarn, comprising extruding at a given rate a plurality of molten streams of nylon 66 polymer through spinneret capillaries; quenching the streams into filaments; withdrawing the filaments from the streams at a given spinning speed above 2200 and less than 5000 meters per minute; merging the filaments into a yarn; and winding the yarn on a package in the absence of a heating step at a winding tension less than 0.4 grams per denier; the rate, the polymer, the capillaries, and the spinning speed being selected such that the yarn forms a stable package and the yarn on the package has a denier between 15 and 250, an RV above 46, and an elongation to break less than 150%.

According to a seventh principal aspect of the invention, there is provided, in a texturing process wherein a nylon 66 feed yarn wound on a supply package at a winding tension less than 0.4 grams per denier is withdrawn from a support package and simultaneously drawn and false-divided while passing sequentially over a heater and through a false-twisting device and wound on a package at a winding speed greater than 450 meters per minute, the improvement wherein the feed yarn has a denier between 15 and 250, a RV greater than 46, and an elongation between 55 and 150%. The winding tension is preferably between 0.03 and 0.25 grams per denier, and the yarn RV is preferably greater than 53, with yarn RV's greater than 60 being particularly advantageous. Yarn elongations between 55 and 100% are especially preferred.

According to a eighth principal aspect of the invention, there is provided a false-twist heatset textured nylon 66 yarn having an R. V. greater than 46 and less than 10 broken filaments per kilogram of yarn. The yarn RV is preferably greater than 53, with an RV greater than 60 being particularly advantageous. Initial crimp development values greater than 19% are preferred, with values of greater than 21% and particularly greater than 24% being especially preferred.

Other aspects will in part appear hereinafter and will in part be apparent from the following detailed description taken together with the accompanying drawing, wherein:

The single FIGURE is a schematic front elevation view of an exemplary spinning position for making PON yarns according to the invention.

As shown in the FIGURE, molten streams 20 of nylon 66 polymer are extruded through capillaries in spinneret 22 downwardly into quench zone 24 supplied with transversely directed quenching air at room temperature. Streams 20 solidify into filaments 26 at some distance below the spinneret within the quench zone. Filaments 26 are converged to form yarn 28 and pass through interfloor conditioner tube 30. A conventional spin-finish is applied to yarn 28 by finish roll 32. Yarn 28 next passes in partial wraps about godets 34 and 36 and is wound on package 38. The filaments may be entangled if desired, as by pneumatic tangle chamber 40.

Ordinarily, godets 34 and 36 perform the functions of withdrawing filaments 26 from streams 20 at a spinning speed determined by the peripheral speed of godet 34, and of reducing the tension in yarn 28 from the rather high level just prior to godet 34 to an acceptable level for winding onto package 38. Winding tensions less than 0.4 grams per denier are essential in order to produce the PON yarn package of the present invention, particularly in commercially acceptable package sizes. The range of 0.03 to 0.25 grams per denier is preferred, with tensions of about 0.1 grams per denier being particularly preferred. Godets 34 and 36 may be dispensed with if the yarn winding tension immediately prior to the winder in the absence of the godets is within the yarn tension ranges indicated in this paragraph. "Winding tension" as used herein means the yarn tension as measured just prior to the yarn traversing and winding mechanism. Some commercially available winders include an auxiliary roll designed to both assist in yarn traversing and to permit reducing the yarn tension as the yarn is wound onto the bobbin or package. Such winders may be of assistance when using the upper portions of the yarn tension ranges, indicated in this paragraph.

EXAMPLE 1

This is an example within the range of present conventional practice. Nylon 66 reference polymer as defined below having an R.V. of 39–40 has its moisture content adjusted such that when spun at a melt temperature of 285° C. as in this example, the yarn has a yarn RV of 40. Spinneret 22 contains 34 capillaries having lengths of 0.012" (0.3 mm.) and diameters of 0.009" (0.229 mm.) Quench zone 24 is 35 inches in height, and is supplied with 20° C. quench air having an average horizontal velocity of 1 foot (30.5 cm.) per second. Filaments 26 are converged into yarn 28 approximately 36 inches (91.4 cm.) below the spinneret. Conditioner tube 30 is 72 inches (183 cm.) long and is of the type disclosed in Koschinek U.S. Pat. No. 4,181,697, i.e., a steamless tube heated to 120° C. through which yarn 28 passes. The speed of godets 34 and 36 are 3500 meters per minute and 3535 meters per minute, respectively, to prevent the yarn from wrapping on; godet 36. The polymer metering rate is selected such that the yarn wound has a denier of 98. The winder used is the Toray 601, and the winder speed is adjusted to provide a winding tension of 0.1 grams per denier. The yarn has an elongation-to-break of 83%, an RV of 40, and a normalized SAXS peak intensity of 1.0 and a normalized lamellar dimensional product of 1.0 (by definition).

The spun yarn is then simultaneously drawn and friction-twist textured on a Barmag FK6-L900 texturing machine using a 2½ meter primary heater and a Barmag disc-aggregate with Kyocera ceramic discs in a draw zone between a feed and a draw or mid roll. The heater temperature is 225° C., and the ratio of the peripheral speed of the discs to draw roll speed (the D/Y ratio) is 1.95. The draw roll speed is set at 750 meters per minute, and the feed roll speed is adjusted to some lower speed to control the draw ratio and hence the draw-texturing stress or tension (the yarn tension between the exit of the heater and the aggregate). In order to maximize the crimp development, the draw ratio is changed by adjustment of the feed roll speed so that the draw-texturing tension is high enough for stability in the false twist zone and yet low enough that the filaments are not broken, this being the operable texturing tension range. Within the operable tension range, the "maximum texturing tension" is defined as the tension producing the maximum initial crimp development without an unacceptable level of broken filaments (frays). More than 10 broken filaments per kilogram of yarn are unacceptable in commercial use.

With the Example 1 yarn, the operable texturing tension range is quite narrow when draw-texturing at 750 meters per minute and with a heater temperature of 225° C. The maximum texturing tension is found to be about 0.43 grams per draw roll denier, and the initial crimp development is about 17–18%. The draw roll denier is defined as the spun yarn denier divided by the mechanical draw ratio provided by the different surface speeds of the feed roll feeding the yarn to the heater and of the draw or mid rill just downstream of the false-twist device. When the texturing tension is more than 0.44 grams per draw roll denier, more than 10 (an unacceptable level) of broken filaments per kilogram of yarn is produced. The textured yarn denier is 70 and the yarn R.V. is 39. As is usual, the textured yarn R.V. is somewhat lower than the feed yarn R.V.

If the broken filaments are ignored and texturing tension is increased beyond 0.43 grams per draw roll denier, initial crimp development increases to about 19–19.5% at a tension of about 0.44 grams per draw roll denier and remains within this range as tensions are further increased. However such yarns are not commercially acceptable since the number of broken filaments (frays) is greater than 10 per kilogram of yarn. With the spun yarn of this example, an attempt to increase initial crimp development by increase in heater temperature much above 225° C. also leads to an unacceptable level of broken filaments, particularly if the draw-texturing stress is also above 0.43 grams per denier.

EXAMPLE 2

As the spinning speed increases from values of 750 MPM to 5000 MPM, the yarn elongation-to-break (elongation) decreases regardless of polymer RV. Applicants have unexpectedly discovered that, while an increase in polymer RV leads to higher tenacity and lower elongation at spinning speeds below about 2200 MPM (at which approximate spinning speed the elongations of yarns spun from 40 and 60 RV are equal), this effect actually reverses at higher spinning speeds. These higher spinning speeds in combination with higher polymer RV's define a hitherto unrecognized regime for spinning PON feed yarns for draw-texturing. The exact speed at which the high RV yarn elongation exceeds that of 40 RV yarn may vary somewhat with polymer RV, filament denier, spinning temperature, quenching conditions, etc., but may readily be determined by experiment.

Table 1 illustrates the hitherto unrecognized regime of high spinning speeds in combination with high RV polymer. The general process of Example 1 above is repeated, except that steam is admitted to the yarn passage through conditioner tube 30, and the yarn denier and spinning speed are varied as indicated in Table 1. The polymer metering pump speed is maintained constant so that the yarn denier varies inversely with spinning speed. The results are shown in Table 1.

TABLE 1

| Item | Denier | Spin Speed MPM | Tenacity | Elongation, % | Yarn RV | Polymer RV |
|---|---|---|---|---|---|---|
| A | 253 | 750 | 1.3 | 287 | 45 | 41 |
| B | 240 | 750 | 1.7 | 175 | 75 | 80 |
| C | 196 | 1000 | 1.5 | 234 | 45 | 41 |
| D | 196 | 1000 | 2.1 | 172 | 75 | 80 |
| E | 105 | 2000 | 2.6 | 125 | 45 | 41 |
| F | 103 | 2000 | 3.1 | 117 | 75 | 80 |
| G | 68 | 3000 | 3.6 | 78 | 45 | 41 |
| H | 68 | 3000 | 3.7 | 104 | 75 | 80 |
| I | 51 | 4000 | 4.2 | 60 | 45 | 41 |
| J | 51 | 4000 | 3.8 | 92 | 75 | 80 |
| K | 43 | 5000 | 3.1 | 43 | 45 | 41 |
| L* | 23 | 5000 | 7.8 | 52 | 75 | 80 |

*Anomalous results, missing filaments discovered upon rechecking denier

Comparison of the elongation values in Table 1 for items spun at the same spinning speeds shows that, up to 2000 MPM, yarns spun from 41 RV polymer have higher elongation than the high RV yarn. Unexpectedly, this behavior reverses as spinning speed is further increased such that at about 3000 MPM and higher speeds the high RV yarn has higher elongation than the low RV yarn. The PON tenacity values show a similar reversal at about the same speed range. The indicated equality of tenacities at about 3000 MPM may be due to errors in statistical sampling or testing rather than demonstrating that the tenacity relationship reversal occurs at a higher speed than the elongation relationship reversal. Similar results occur if steam is not admitted to the yarn passage of the conditioner tube, which is preferred to the use of steam.

EXAMPLE 3

The spinning process in Example 1 is repeated, except the polymer R.V. is increased to 46 and is dried to a very low moisture content. The yarn has an R.V. of 55 and the elongation-to-break is increased to 95%. When the yarn is draw-textured as in Example 1 at its maximum texturing tension, it is found that the initial crimp development is about 21%, but the textured denier is below the desired target level of 70 denier.

This may be compensated for by either inreasing the spinning speed to decrease the spun elongation-to-break or by increasing the spun denier, or both, in any case providing a substantial increase in spinning productivity as compared to the conventional process of Example 1. Accordingly the spinning process of this example is repeated, increasing polymer metering rate and thus the spun yarn denier to 104. The spun yarn has an elongation-to-break of 103%, a normalized SAXS peak intensity of about 1.49, a normalized lamellar dimensional product of about 2.4, and R.V. of 55.

When spun yarn of this paragraph is draw-textured at 750 meters per minute, its maximum texturing tension is found to be about 0.47 grams per draw roll denier and the operable range of yarn tensions in the false-twist zone is broader than with the Example 1yarn. Furthermore, a heater temperature of 245° C. is feasible, in sharp contrast to the Example 1 texturing process. This combination of higher heater temperature and higher optimum texturing tension produces an initial crimp development of 21%. The textured yarn R.V. is 53 and its normalized SAXS peak intensity is about 1.17. Finished fabrics knitted from the textured yarn of this paragraph have a soft hand, comparable to finished fabrics knitted from the Example 1 textured yarn, and greater covering power than similar fabrics formed from the Example 1 textured yarn.

If the texturing tension is further increased, initial crimp development increases to the range between 22–22.5%, although such yarns are commercially unacceptable due to the excessive number of broken filaments and to yarn breaks.

EXAMPLE 4

The spinning process of the first paragraph of Example 1 is repeated, except the polymer R.V. is increased to 79. The yarn has a still further increased elongation-to-break of 105% and an R.V. of 80. As in the first paragraph of Example 3 above, it is found that the textured yarn denier is below the target level of 70 denier when the spun yarn is textured at its maximum texturing tension, although the initial crimp development is about 25%.

As in the second paragraph of Example 3, the further increase in yarn R.V. permits a still further increase in productivity by either increasing spinning speed or by increasing spun denier. Accordingly, the spinning process of this example is repeated, increasing the polymer metering rate to provide a spun yarn denier of 110. The spun yarn has an elongation-to-break of 100%, a normalized SAXS peak intensity of about 1.85, a normalized lamellar dimensional product of about 2.3, and the yarn R.V. is 80. When the spun yarn of this paragraph is draw-textured as in Example 3 (245° C. heater), its maximum texturing tension is found to be 0.54 grams per draw roll denier and the operable range of yarn tensions in the false-twist zone is even broader than in the case of Example 3 above. The textured yarn has an initial crimp development of about 25.5%, which is comparable to the levels achieved by the pin-twist process. The textured yarn R.V. is 73 and its normalized SAXS peak intensity is greater than 1.3. Finished fabrics formed from the textured yarn of this example have still greater covering power than similar fabrics formed from the textured yarn of Example 3.

Further increases in texturing tension do not appreciably affect the crimp development, but merely result in broken filaments or yarn breaks.

Higher draw-texturing speeds require higher draw-texturing tensions for stability. PON yarns according to the invention are therefore expected to be even more suited than the Example 1 yarn for still higher draw-texturing speeds than 750 meters per minute.

EXAMPLE 5

A series of yarns is spun at 3500 MPM and draw-textured as set forth in Table 2 below. The resulting textured yarns are plied and knit into jersey fabrics which are conventionally finished. The finished fabrics are characterized in Table 2.

TABLE 2

| | Item 1 | Item 2 | Item 3 | Item 4 |
|---|---|---|---|---|
| Polymer RV | 40 | 56 | 67 | 80 |
| Spun denier | 101 | 109 | 110 | 110 |
| Elongation, % | 80 | 96 | 114 | 103 |
| Draw ratio | 1.43 | 1.557 | 1.564 | 1.557 |
| D/Y | 2.042 | 1.856 | 1.953 | 2.073 |
| Heater temp, oc | 225 | 230 | 235 | 240 |
| Texturing tension, grams/denier | 0.435 | 0.455 | 0.442 | 0.455 |
| Plied denier | 147 | 146 | 147 | 146 |
| Crimp development, % | 15.2 | 17.4 | 20.0 | 20.4 |

TABLE 2-continued

| | Item 1 | Item 2 | Item 3 | Item 4 |
|---|---|---|---|---|
| Frays/1750 M | 1.4 | 0.7 | 1.2 | 1.3 |
| Yarn breaks/lb | 0.000 | 0.046 | 0.059 | 0.037 |
| Fabric finished weight oz/yd2 | 4.14 | 4.12 | 4.32 | 4.21 |
| Wales/in | 34.4 | 34.4 | 33.8 | 33.9 |
| Courses/in | 49.3 | 50.2 | 51.6 | 50.6 |
| 6-ply fabric thickness, in. | .133 | .134 | .132 | .133 |
| Relative Air Permeability, volume/area/time | 170.7 | 152.2 | 140.2 | 136.6 |

The finished fabrics from items 2–4 in Table 2 above exhibit increased covering power as compared to the fabric made from control item 1. This is apparent not only visually, but also as measured by the progressively reduced air permeability of fabric items 2–4 as compared to fabric item 1.

EXAMPLE 6

Preliminary indications are that the improved properties attained with nylon 66 occur to a lesser degree with increased RV nylon 6. A batch of nylon 6 polymer flake is dried and spun as 34 filament yarn at 3500 MPM as indicated in Table 3 using the steamless hot tube as in example 1, then textured as indicated in Table 4, with resulting textured yarn properties as indicated in Table 5.

TABLE 3

| Spun Item | Flake Drying Time, Hours | Denier | Elong., % | Finish Level, % | Yarn RV |
|---|---|---|---|---|---|
| 1 | 5 | 110 | 62 | 0.43 | |
| 2 | 5 | 97 | 67 | 0.54 | 38.6 |
| 3 | 60 | 96 | 75 | 0.54 | 49.2 |
| 4 | 60 | 113 | 69 | 0.39 | |

TABLE 4

| Texturing Item | Spun Item | Heater Temp., °C. | Draw-roll Denier | Stress, gm/d | Draw Ratio |
|---|---|---|---|---|---|
| 17 | 1 | 210 | 83 | 0.36 | 1.29 |
| 18 | 1 | 210 | 80 | 0.43 | 1.33 |
| 19 | 2 | 210 | 71 | 0.43 | 1.34 |
| 20 | 2 | 210 | 69 | 0.50 | 1.39 |
| 21 | 3 | 210 | 69 | 0.45 | 1.37 |
| 22 | 4 | 210 | 86 | 0.35 | 1.30 |
| 23 | 2 | 200 | 71 | 0.42 | 1.33 |
| 24 | 3 | 200 | 69 | 0.43 | 1.35 |
| 25 | 2 | 190 | 71 | 0.42 | 1.34 |
| 26 | 3 | 190 | 69 | 0.44 | 1.36 |

TABLE 5

| Texturing Item | Denier | Elong., % | Crimp Dev., % | Frays/ 1750 M |
|---|---|---|---|---|
| 17 | 89 | 22 | 9.1<br>7.9 | 46 |
| 18 | 86 | 17 | 9.2<br>8.4 | 119 |
| 19 | 74 | 17 | 11.0<br>10.1 | 284 |
| 20 | 72 | 16 | 11.0<br>10.3 | 381 |
| 21 | 71 | 20 | 12.4<br>11.1 | 26 |
| 22 | 89 | 23 | 10.3<br>8.8 | 11 |
| 23 | 74 | 21 | 11.3<br>11.1 | 6 |
| 24 | 72 | 22 | 11.8 | 0 |

TABLE 5-continued

| Texturing Item | Denier | Elong., % | Crimp Dev., % | Frays/ 1750 M |
|---|---|---|---|---|
| | | | 12.8 | |
| 25 | 76 | 23 | 10.1<br>10.6 | 0 |
| 26 | 73 | 26 | 10.4<br>11.0 | 0 |

A further batch of nylon 6 polymer is divided and dried to different moisture levels, then spun as 34 filament yarns at 3500 MPM with the conditioner tube heated to 130° C. to provide the yarns in Table 6.

TABLE 6

| Spun Item | Denier | Elong., % | Yarn RV |
|---|---|---|---|
| A | 95 | 78 | 38 |
| B | 97 | 84 | 100+ |

The Table 6 spun yarns are drawtextured at 750 MPM over a 2.5 meter heater at 195° C., with conditions and textured yarn properties given in Table 7.

TABLE 7

| Item | Draw-roll Denier | Stress, g/d | Draw Ratio | D/Y | Crimp Dev. % |
|---|---|---|---|---|---|
| A | 71 | 0.428 | 1.322 | 2.042 | 97 |
| B | 70 | 0.430 | 1.365 | 2.042 | 8.89 |

In Table 5, two crimp development determinations are given for each textured item. Comparison of the data of this example with that for the Example 1 yarns above indicates that, even with feed yarn RV increased to 100, nylon 6 textured yarns have crimp development greatly inferior to that of textured yarns made from nylon 66 feed yarns having nominal 40 RV.

EXAMPLE 7

It has further been discovered that, contrary to the teachings of the prior art, PON yarns can be successfully spun and wound onto stable packages without subjecting the yarn to any form of heat prior to winding, providing that the spinning speed is sufficiently high for the yarn RV. Thus the 55 R.V. yarn of Example 3 above can be successfully spun without a heating step and wound at 4000 meters per minute, as can be 80 R.V. yarn of Example 4 at 3500 meters per minute. This is contrary to the teachings of, for example, Adams U.S. Pat. No. 3,994,121 and Koschinek U.S. Pat. No. 4,181,697. The minimum spinning speed required for a given yarn RV is expected to vary with filament denier, and can readily be determined by experiment.

65 RV yarn having 116 denier and 34 filaments is spun without godets and without heat prior to winding at 3500 MPM using the Barmag SW4SLD winder, which winder includes the auxiliary roll (noted above) designed to both assist in yarn traversing and to permit reducing the yarn tension as the yarn is wound onto the package. Spinning performance is as good as or better than with heat applied in the conditioner tube. Spin finish is applied just above and just below the unheated conditioner tube. The spun yarn has an elongation of 113%, and draw-texturing performance at a draw roll (mid roll) speed of about 875 MPM and the resulting textured yarn properties are at least as good as for a yarn similarly spun using a dry heated conditioner tube and similarly textured.

TEXT METHODS AND DEFINITIONS

All yarn packages to be tested are conditioned at 21 degrees C. and 65% relative humidity for one day prior to testing.

The yarn elongation-to-break (elongation) is measured one week after spinning. Fifth yards of yarn are stripped from the bobbin and discarded. Elongation-to-break is determined using an Instron tensile testing instrument. The gage length (initial length) of yarn sample between clamps on the instrument) is 25 cm., and the crosshead speed is 30 cm. per minute. The yarn is extended until it breaks. Elongation-to-break is defined as the increase in sample length at the time of maximum load or force (stress) applied, expressed as a percentage of the original gage length(25 cm.).

Crimp development is measured as follows. Yarn is wound at a positive tension less than 2 grams on a Suter denier reel or equivalent to provide a 1½ meter circumference skein. The number of reel revolutions is determined by 2840/yarn denier, to the nearest revolution. This provides a skein of approximately 5680 skein denier and an initial skein length of 9/16 meter. A 14.2 gram weight or load is suspended from the skein, and the loaded skein is placed in a forced-air oven maintained at 180° C. for 5 minutes. The skein is then removed from the oven and conditioned for 1 minute at room temperature with the 14.2 gram weight still suspended from the skein, at which time the skein length $L_2$ is measured to the nearest 0.1 cm. The 14.2 gram weight is then replaced with a 650 gram weight. Thirty seconds after the 650 gram weight is applied to the skein, the skein length $L_3$ is measured to the nearest 0.1 cm. Percentage crimp development is defined as $L_3-L_2/L_3\times 100$. Crimp development decreases with time as the textured yarn ages on the bobbin, rapidly for the first hours and days, then more slowly. When "initial crimp development" is specified herein, the measurement is made about one day after texturing.

The yarn is tested for processability as follows. The spun yarn is simultaneously drawn and friction-twist textured on a Barmag FK6-L900 texturing machine having a 2.5 meter heater between the feed roll and the draw roll. A Barmag type 6 aggregate with Hyocera "D" profile 6 mm thick×50 mm diameter ceramic working discs is mounted in the texturing zone between the heater and the draw or mid roll. The discs are arranged 0-9-1 on each of the three aggregate shafts from inlet end to outlet end (no inlet guide disc, 9 Kyocera working discs, 1 outlet chromium plated guide disc). The three shafts are parallel and spaced 37.5 mm apart to form an equilateral triangle. The interleaved discs are axially spaced 0.75 mm apart from the adjacent discs on the adjoining shafts. The heater temperature is 230° C., and the ratio of the peripheral speed of the discs to draw roll speed (the D/Y ratio) is 1.953. The draw roll speed is set at 800 meters per minute, and the feed roll speed is adjusted to a lower speed selected to provide a specified draw-texturing stress. The textured yarn is wound at a winding speed of 758 meters per minute. Broken filaments (frays) are determined visually, by counting the number of broken filaments on the exposed end surfaces of the package. More than 10 frays per kilogram of textured yarn are unacceptable.

Relative viscosity (R.V.) is determined by ASTM D789-81, using 90% formic acid.

Broken filaments are determined visually, by counting the number of broken filaments on the exposed surfaces of the package.

The reference polymer is nylon-66 formed from stoichiometric amounts of hexamethylene diamine and adipic acid, further containing as the sole additives 44 parts per million manganese hypophosphite monohydrate, 898 parts per million acetic acid as a molecular weight stabilizer and 3000 parts per million titanium dioxide pigment. Polymerization is conventional, to provide a nominal polymer R.V. of 38–40.

The reference yarn is prepared by appropriately adjusting the moisture level in the reference polymer, then spinning under the same spinning conditions as the yarn being tested was made to provide a 40 RV reference yarn having the same denier and denier per filament as the yarn sample being tested.

X-RAY TECHNIQUES

The X-ray diffraction patterns (small angle X-ray scattering, or SAXS) are recorded on NS54T Kodak no-screen medical X-ray film using evacuated flat plate Laue cameras (Statton type). Specimen to film distance is 32.0 cm.; incident beam collimator length is 3.0 inches, exposure time is 8 hours. Interchangeable Statton type yarn holders with 0.5 mm. diameter pinholes and 0.5 mm. yarn sheath thickness are used throughout as well as 0.5 mm. entrance pinholes. The filaments of each sheath of yarn are aligned parallel to one another and perpendicular to the X-ray beam. A copper fine focus X-ray tube ($\lambda=1.5418$ Å) is used with a nickel filter at 40 KV and 26.26 MA, 85% of their rated load. For each X-ray exposure a single film is used in the film cassette. This film is evaluated on a scanning P-1000 Obtronics Densitometer for information concerning scattering intensity and discrete scattering distribution characteristics in the equatorial and meridional directions. A curve fitting procedure, using Pearson VII functions [see H. M. Heuvel and R. Huisman, J. Appl. Poly. Sci., 22, 2229–2243 (1978)] together with a second order polynominal background function, is used to fit the experimental data prior to calculation. A meridional scan is performed, the discrete scattering fitted, equatorial scans are performed through each discrete scattering maxima and then again the data is fitted via a parameter fit procedure.

The peak height intensity is taken as an average of the four fitted intensity distributions (i.e., the two mirrored discrete scattering distributions in the meridional directions and the two equatorial distributions through these meridional maxima). The normalized SAXS peak intensity is then simply the ratio of the measured peak intensity to that of the measured peak intensity of a 40 RV yarn sample of the same denier and denier per filament spun from the reference polymer under the same conditions as the yarn sample.

The SAXS discrete scattering X-ray diffraction maxima are used to determine the average lamellar dimensions. In the meridional direction this is taken here to be the average size of the lamellar scatterer in the fiber direction and in the equatorial direction, the average size of the lamellar scattered in a direction perpendicular to the fiber direction. These sizes are estimated from the breadth of the diffraction maxima using Scherrer's methods.

$$D(\text{meridional or equatorial})=K\lambda/\beta\cos\theta.$$

where K is the shape factor depending on the way $\beta$ is determined, as discussed below, $\lambda$ is the X-ray wave length, in this case 1.5418 Å, $\theta$ is the Bragg angle, and $\beta$ the spot width of the discrete scattering in radians.

$$\beta(\text{meridional}=2\theta_D-2\theta_\beta.$$

where $2\theta_D(\text{radians})=\text{Arctan}((HW+w)/2r)$ $2\theta_\beta(\text{radians})=\text{Arctan}((HW-w)/2r)$ r = the fiber to film distance 320 mm.

w = the corrected half width of the scattering as discussed below

HW = peak to peak distance (mm.) between discrete scattering maxima

The Scherrer equation is again used to calculate the size of the lamellar scattered in the equatorial direction through the discrete scattering maxima, $$\beta(\text{equatorial})=2\ \text{Arctan}(w/2R^*)$$

where $R^*=(HW/2)^2+(320)^2)^{178}$

Warren's correction for line broadening due to instrumental effects is used as a correction for Scherrer's line broadening equation.

$$W_m{}^2=w^2+w^2$$

where $W_m$ is the measured line width, W = 0.39 mm. is the instrumental contribution obtained from inorganic standards, and w is the corrected line width (either in the equatorial or meridional directions) used to calculate the spot width in radians, $\beta$. The measured line width $W_m$ is taken as the width at which the diffraction intensity on a given film falls to a value of one-half the maximum intensity and is the half width parameter of the curve fitting procedure. Correspondingly, a value of 0.90 is employed for the shape factor K in Sherrer's equations. Any broadening due to variation of periodicity is neglected.

The lamellar dimensional product is given then by $$LDP=D(\text{meridional})\times D(\text{equatorial})$$

and the normalized lamellar dimensional product is then simply the ratio of the lamellar dimensional product to that of a 40 RV yarn sample of the same denier and denier per filament spun from the reference polymer under the same conditions as the yarn sample.

What is claimed is:

[1. A nylon 66 apparel yarn suitable for false-twist texturing, said yarn having:

(a) a denier between 15 and 250;

(b) a normalized SAXS peak intensity of at least 1.3; and (c) a normalized lamellar dimensional product of at least 1.3.]

[2. A multifilament nylon 66 feed yarn for drawtexturing spun at a spinning speed greater than 2200 MPM, said yarn being wound on a package at a winding tension less than 0.4 grams per denier and having:

(a) an RV greater than 46;

(b) an elongation between 55 and 150%; and (c) a denier between 15 and 250.]

[3. The yarn defined in claim 2, wherein said winding tension is between 0.03 and 0.25 grams per denier.]

[4. The yarn defined in claim 2, wherein said yarn has a normalized SAXS peak intensity greater than 1.3 and a normalized lamellar dimensional product greater than 1.3.]

[5. The yarn defined in claim 2, wherein said yarn has a denier between 35 and 140.]

6. A multifilament nylon 66 [feed] yarn *suitable* for *false-twist* drawtexturing spun at a spinning speed greater than 2200 MPM, said yarn being wound on a package at a winding tension less than 0.4 grams per denier and having:

(a) an RV greater than 53;

(b) an elongation between 55 and 150%; and (c) a denier between 15 and 250.

7. The yarn defined in claim 6, wherein said winding tension is between 0.03 and 0.25 grams per denier.

8. The yarn defined in claim 6, wherein said yarn has a normalized SAXS peak intensity greater than 1.3 and a normalized lamellar dimensional product greater than 1.3.

9. The yarn defined in claim 6, wherein said yarn has a normalized SAXS peak intensity greater than 1.75 and a normalized lamellar dimensional product greater than 1.75.

10. A multifilament nylon 66 [feed] yarn *suitable* for *false-twist drawtexturing spun at a spinning speed greater than* 2200 MPM, said yarn being wound on a package at a winding tension less than 0.4 grams per denier and having:

(a) an RV greater than 60;

(b) an elongation between 55 and 150%; and (c) a denier between 15 and 250.

11. The yarn defined in claim 10, wherein said winding tension is between 0.03 and 0.25 grams per denier.

12. The yarn defined in claim 10, wherein said yarn has a normalized SAXS peak intensity greater than 1.3 and a normalized lamellar dimensional product greater than 1.3.

13. The yarn defined in claim 10, wherein said yarn has a normalized SAXS peak intensity greater than 1.75 and a normalized lamellar dimensional product greater than 1.75.

[14. A multifilament nylon 66 feed yarn for drawtexturing spun at a spinning speed greater than 2200 MPM, said yarn being wound on a package at a winding tension less than 0.4 grams per denier and having:

(a) a denier between 15 and 250;

(b) a normalized SAXS peak intensity greater than 1.3; and (c) a normalized lamellar dimensional product greater than 1.3.]

[15. The defined in claim 14, wherein said normalized SAXS peak intensity and said normalized lamellar dimensional product are greater than 1.75.]

[16. A multifilament nylon 66 feed yarn for drawtexturing spun at a spinning speed greater than 2200 MPM, said yarn being wound on a package at a winding tension less than 0.4 grams per denier and having:

(a) a denier between 15 and 250; and (b) a normalized SAXS peak intensity greater than 1.3]

[17. The yarn defined in claim 16, wherein said yarn has a normalized SAXS peak intensity greater than 1.75.]

* * * * *